US009328759B2

(12) United States Patent
Kuhm et al.

(10) Patent No.: US 9,328,759 B2
(45) Date of Patent: May 3, 2016

(54) FASTENING CLIP

(71) Applicant: TRW Automotive Electronics & Components GmbH, Radolfzell (DE)

(72) Inventors: Michel Kuhm, Ingwiller (FR); Jean Luc Klein, Ringendorf (FR)

(73) Assignee: TRW Automotive Electronics & Components GmbH (DE)

( * ) Notice: Subject to any disclaimer, the term of this patent is extended or adjusted under 35 U.S.C. 154(b) by 105 days.

(21) Appl. No.: 14/147,655

(22) Filed: Jan. 6, 2014

(65) Prior Publication Data

US 2014/0196259 A1    Jul. 17, 2014

(30) Foreign Application Priority Data

Jan. 17, 2013  (FR) ...................................... 13 50418

(51) Int. Cl.

| F16B 19/00 | (2006.01) |
| B60R 13/02 | (2006.01) |
| F16B 5/06  | (2006.01) |
| F16B 21/08 | (2006.01) |

(52) U.S. Cl.
CPC ........... *F16B 19/002* (2013.01); *B60R 13/0206* (2013.01); *F16B 5/0657* (2013.01); *F16B 21/086* (2013.01); *Y10T 24/30* (2015.01)

(58) Field of Classification Search
CPC . B60R 13/0206; F16B 19/002; F16B 21/086; F16B 5/0657; Y10T 24/30
USPC ........ 24/187, 292, 71 ST, 289, 453, 458, 297; 411/508, 509
See application file for complete search history.

(56) References Cited

U.S. PATENT DOCUMENTS

| 3,181,411 | A | * | 5/1965 | Mejlso ................ 411/508 |
| 3,550,217 | A | * | 12/1970 | Collyer ................ 411/509 |
| 3,678,797 | A | * | 7/1972 | Seckerson ............ 411/509 |
| 3,776,092 | A | * | 12/1973 | Seckerson ............ 411/509 |
| 5,393,185 | A | * | 2/1995 | Duffy, Jr. ............. 411/510 |
| 5,573,362 | A | * | 11/1996 | Asami et al. ......... 411/509 |
| 5,592,719 | A | * | 1/1997 | Eto et al. .............. 24/453 |
| 5,651,634 | A | * | 7/1997 | Kraus ................ 403/408.1 |
| 6,305,055 | B1 | * | 10/2001 | Castro ................... 24/458 |
| 6,572,317 | B2 | * | 6/2003 | Okada et al. ......... 411/508 |
| 6,804,864 | B2 | * | 10/2004 | Kirchen et al. ........ 24/297 |
| 7,481,474 | B2 | * | 1/2009 | Higgins et al. ....... 296/1.08 |
| 2002/0106261 | A1 | * | 8/2002 | Nakanishi ............ 411/508 |

(Continued)

FOREIGN PATENT DOCUMENTS

| DE | 10023109 | 11/2001 |
| GB | 1165413 | 3/1968 |

*Primary Examiner* — Robert J Sandy
*Assistant Examiner* — David Upchurch
(74) *Attorney, Agent, or Firm* — Tarolli, Sundheim, Covell & Tummino LLP

(57) ABSTRACT

In a fastening clip (10), in particular for a lining part (12) of a vehicle, including a base body (16) which has a retaining portion (20) for the lining part (12) and a fastening portion (22) provided thereon, which can be inserted into an opening (24) of a vehicle-fixed component (14), in particular of a vehicle body part, and which can latch therein, the fastening portion (22) includes at least two flexible latching wings (48) each held on a flexible web (40), the webs (40) being spaced apart from each other, and the latching wings (48) extending from the webs (40) away from each other, and a flexible connecting element (42) connecting the webs (40) on the entire length to each other being provided between the webs (40).

6 Claims, 4 Drawing Sheets

(56) References Cited

U.S. PATENT DOCUMENTS

| | | |
|---|---|---|
| 2005/0095084 A1* | 5/2005 | Hansen .......................... 411/508 |
| 2005/0244250 A1* | 11/2005 | Okada et al. ................... 411/508 |
| 2006/0000064 A1* | 1/2006 | Leverger et al. ................ 24/297 |
| 2009/0022567 A1* | 1/2009 | Huet .............................. 411/363 |
| 2009/0252573 A1* | 10/2009 | Nakazato ....................... 411/510 |
| 2009/0265900 A1* | 10/2009 | Okada et al. .................... 24/458 |
| 2011/0243688 A1* | 10/2011 | Klein et al. .................... 411/510 |
| 2012/0110793 A1* | 5/2012 | Watanabe et al. ............... 24/289 |
| 2012/0261942 A1* | 10/2012 | Benedetti ................... 296/146.7 |

* cited by examiner

FASTENING CLIP

BACKGROUND OF THE INVENTION

The invention relates to a fastening clip, in particular for a lining part of a vehicle, comprising a base body which has a retaining portion for the lining part and a fastening portion provided thereon which can be inserted into an opening of a vehicle-fixed component, in particular a of vehicle body part, and which can latch therein.

Fastening clips are used to mount add-on parts, for example lining parts, in a body-fixed manner in a vehicle. Openings into which the fastening clip can be inserted and fixed therein by latching for example are provided on the side of the vehicle. However, the openings often have different sizes, so that fastening clips of different sizes are necessary to securely fasten the add-on part. Though fastening clips are known from the prior art which have a flexible fastening portion to be inserted into fastening openings of different sizes, the insertion of the fastening clip into the openings is difficult, or the fastening clips have only an insufficient retaining force in the opening.

SUMMARY OF THE INVENTION

The object of the invention is to provide a fastening clip which permits a flexible adaptation to openings of different sizes and ensures a secure hold of the fastening clip in the opening.

To achieve the object, a fastening clip is provided, in particular for a lining part of a vehicle, comprising a base body which has a retaining portion for the lining part and a fastening portion provided thereon, which can be inserted into an opening of a vehicle-fixed component, in particular of a body part, and which can latch therein. According to the invention, the fastening portion includes at least two flexible latching wings which are each held on a flexible web, the webs being spaced apart from each other, and the latching wings extending from the webs away from each other, a flexible connecting element connecting the webs to each other on the entire length being provided between the webs. The fastening clip according to the invention has a fastening portion which permits an improved adaptation to the size of the opening, which however also ensures a secure hold in the opening. On the one hand, the webs can spring towards each other as they are spaced apart, and can thus already adapt to openings of different sizes. The latching wings are configured such that they can latch on the rear side of the opening and can thus ensure the hold of the fastening clip in the opening. The latching wings extending away from the webs are also flexible so that an additional adaptation to the size of the opening is possible. As the webs are connected to each other by means of a flexible connecting element, they can spring back into their initial position after insertion into the opening, so that a secure hold of the fastening clip in the opening and an adaptation to the size of the opening are ensured. This flexible connecting element further provides an additional supporting function preventing a buckling away or a bending-over of the fastening portion, in particular of the webs, as a result of which the stability of the webs and thus of the fastening portion is improved.

The webs are for example arranged in an acute angle, in particular in a V-shape with respect to each other, the connecting element being preferably provided on the adjacent borders. In this embodiment, the latching wings are provided at the free ends which have an increased spring travel and therefore an improved adaptation to openings of different sizes due to the larger distance. The latching wings preferably extend away from the webs towards the connecting element so that as viewed in cross-section, the fastening portion is configured in a W-shape or in an accordion-like manner and can be folded accordingly. As the webs are arranged in a V-shape rather than parallel to each other, they could only buckle away in different directions, more specifically each perpendicularly to its face. However, as both webs are connected to each other on the entire length by means of the connecting element, they support each other so that a buckling is securely prevented.

The latching wings are preferably held on the webs substantially on the entire length thereof. The fastening portion thus obtains additional stability as the latching wings, as viewed in cross-section, also preferably enclose an acute angle along with the respective web. The stability against a buckling away is thus additionally increased, the flexibility of the latching wings or of the fastening portion for adaptation to an opening of a vehicle-fixed component being not restricted.

The latching wings can be configured in a substantially semi-conical manner or can be configured such that the outer surfaces thereof are located on a common cone surface.

The radius of this cone or the largest radius of the fastening clip is preferably between 5 and 15 mm, as viewed in cross-section.

The retaining portion may for example have a seat, in particular for a lining part, the seat having a plate-like flange onto which the lining part can be slipped.

The flange preferably includes a surrounding ring and a head, the ring being mounted to the head by means of spring elements so as to be rotatable to a limited extent. The ring can thus be shifted to a limited extent with respect to the head so that tolerance compensation between the opening of the vehicle-fixed component and the receiving portion of the lining part is permitted, as the seat which holds the lining part can be slightly shifted with respect to the opening.

The spring elements preferably extend in a spiral manner from the head to the ring so that they can provide a good spring function.

BRIEF DESCRIPTION OF THE DRAWINGS

Further advantages and features will become apparent from the description below along with the accompanying drawings which show.

DESCRIPTION OF EMBODIMENT

Figure 1:
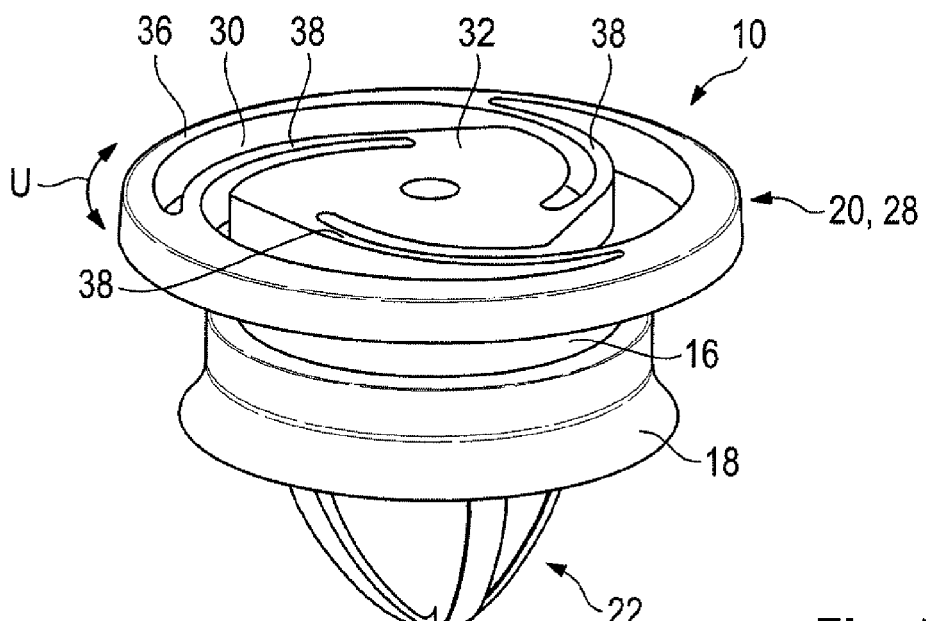
FIG. 1 a perspective view of a fastening clip according to the invention.
Figure 8:
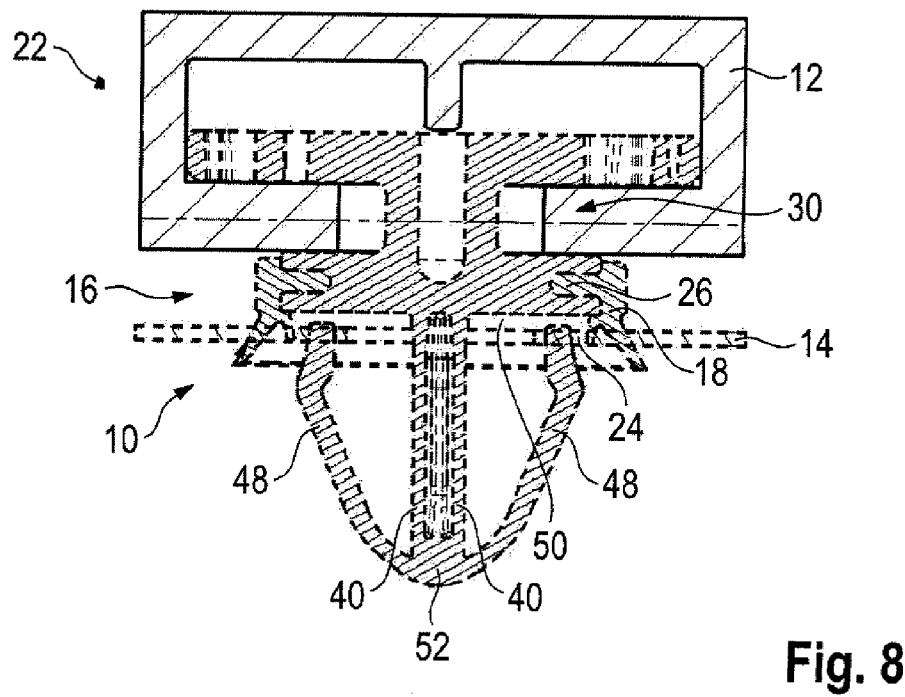

FIG. 1 shows a fastening clip 10 for fastening an add-on part, a lining part 12 for example, to a vehicle body part 14 (see also FIG. 8).

The fastening clip 10 has a substantially disk-shaped base body 16 which has a surrounding seal 18 provided thereon. The base body 16 is furthermore provided with a retaining portion 20 to which the lining part 12 can be mounted, and a fastening portion 22 to fix the fastening clip 10 in an opening 24 of the vehicle body part 14 (see FIG. 8).

Figure 2:
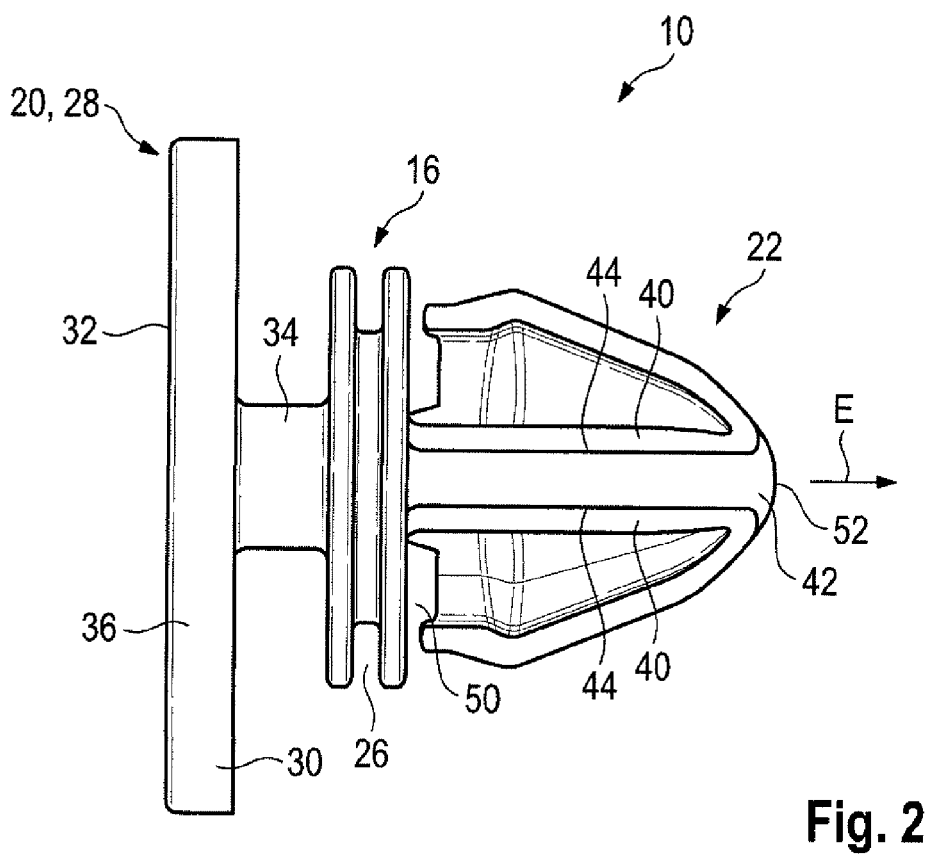
FIG. 2 a lateral view of the fastening clip of FIG. 1.

As can be seen in FIG. 2, the base body 16 is configured in a substantially plate-like manner and has a surrounding groove 26 for fastening the seal 18.

Figure 3:
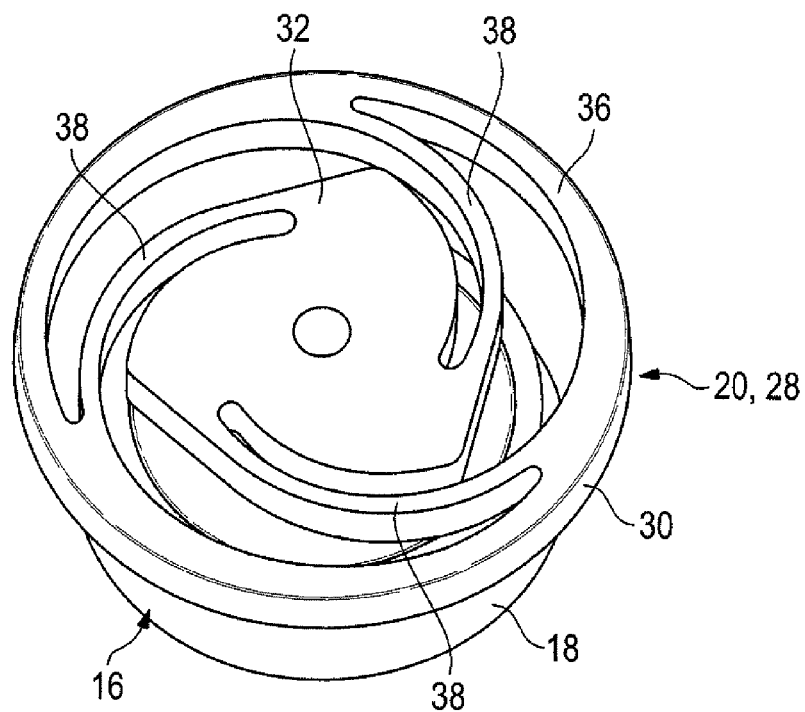
FIG. 3 a view of the retaining portion of the fastening clip of FIG. 1.
Figure 4:
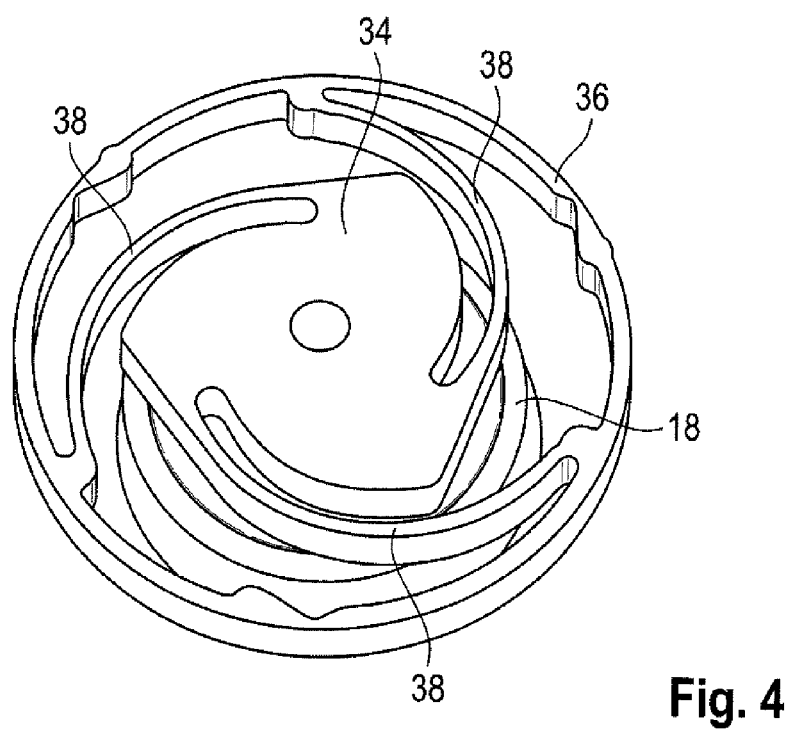
FIG. 4 a sectional view through the fastening portion of the fastening clip of FIG. 1, FIG. 5 a second sectional view through the fastening portion of the fastening clip of FIG. 1, FIG. 6 a longitudinal section through the fastening clip of FIG. 1, FIG. 7 a perspective view of the fastening portion of the fastening clip of FIG. 1, and FIG. 8 a sectional view through the fastening clip of FIG. 1 in the mounted state.

The retaining portion 20 includes a seat 28 for the lining part 12, which includes a plate-like flange 30 (FIGS. 3 and 4). The plate-like flange 30 has a head 32 connected to the base body 16 by a prolongation 34. A ring 36 is furthermore provided which encloses the head 32 in the peripheral direction and which is mounted to the head 32 by means of a plurality of spring elements 38 extending in a spiral manner from the head 32 to the ring 36.

Due to the spiral spring elements 38, the ring 36 is mounted to the head 32 so as to be rotatable to a limited extent in the peripheral direction U and shiftable in the plane of the ring 36.

The lining part 12 is fastened to the ring 36 and can be shifted or rotated to a limited extent along with the ring 36 with respect to the base body or the fastening portion 22, as a result of which the assembling of the lining part 12 or of the fastening clip 10 is simplified or a tolerance compensation between the opening 24 or the body part 14 and the lining part 12 can be achieved.

As can be seen in particular in FIG. 2, the fastening portion 22 includes two planar webs 40 extending in the direction of insertion E. The webs 40, as viewed in cross-section, are arranged in a V-shape and enclose an angle of approx. 20° (see FIG. 5).

Both webs 40 are configured so as to be flexible, so that they can spring towards each other. At the adjacent borders 44 of the webs 40, the latter are connected to each other on the entire length in the direction of insertion E by means of a flexible connecting element 42.

Each of the free borders 46 of the webs which are spaced further apart is provided with a latching wing 48.

The latching wings 48 are held on the webs 40 substantially on the entire length thereof, a gap 50 being formed between the latching wings 48 and the base body 16 (FIG. 2). As seen in cross-section (see FIG. 5), the latching wings 48 extend approximately on a circular path K away from the web 40, each latching wing 48, as seen in cross-section, extending approximately across a quarter circle.

Figure 6:
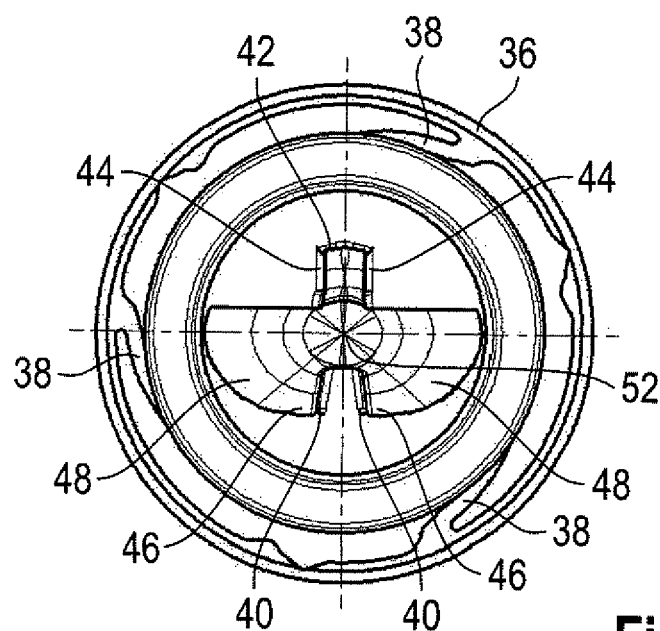
Figure 7:
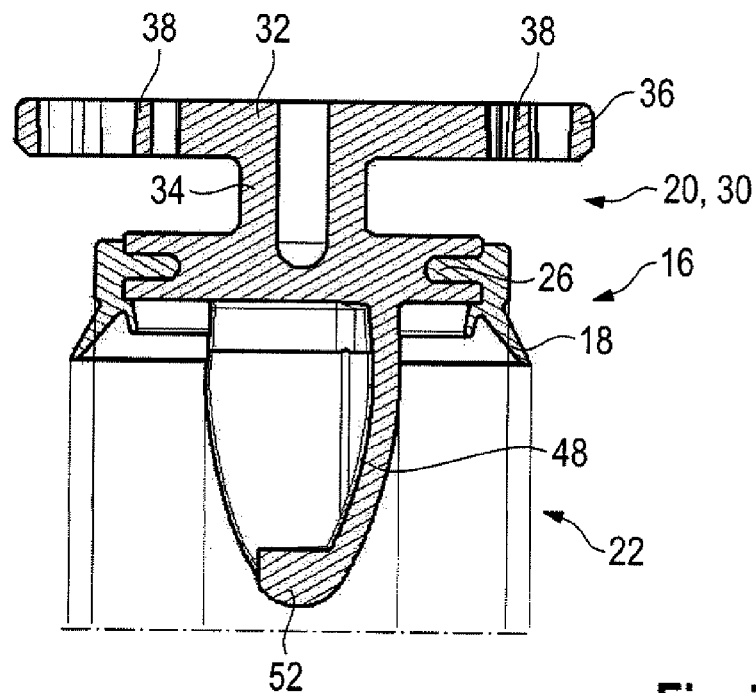

The latching wings 48 taper in the direction of insertion E so as to merge into the webs 40 in the region of the tip 52 (FIGS. 2 and 6). As is in particular visible in FIGS. 1 and 7, the latching wings 48 are thus configured in a substantially semi-conical manner, the outer surfaces of both latching wings 48 being located approximately on a common cone surface. The cone has an opening angle of approx. 20°.

The maximum radius R of the latching wings 48 is preferably between 5 and 15 mm.

The latching wings 48 taper in the region opposite the base body 16 which is arranged at the rear in the direction of insertion E, the radius of the envelope of the latching wings 48 thus becoming smaller. In this region, the outer surfaces of the latching wings 48 are approximately located on a cone oriented in the opposite direction.

The webs 40 and the latching wings 48 are configured so as to be flexible. The connecting element 42 can also yield in a flexible manner.

To mount the fastening clip 10, the latter is inserted with the fastening portion 22 in the direction of insertion E into the opening 24 of a component 14 (FIG. 8).

As both the latching wings 48 and the webs 40 have a flexible configuration, the fastening clip 10 can adapt in a flexible manner to the size of the opening 24. First, the latching wings 48 can yield in a flexible manner and can be pushed against the webs 40. As they also have a flexible configuration and are connected merely by a flexible connecting element 42, the webs 40 can furthermore spring towards each other until they rest in a planar manner on each other.

Figure 5:
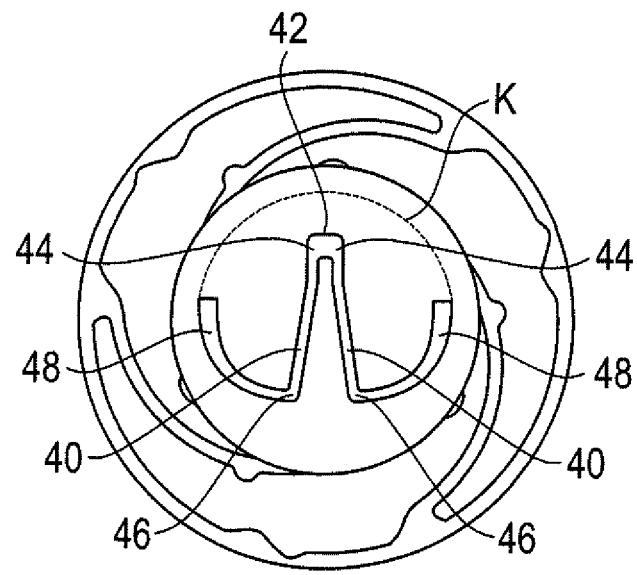

As can be seen in particular in FIG. 5, the latching wings and the webs 40, as seen in cross-section, are arranged in an accordion-like manner or in a W-shape so that they can be folded, so to speak, towards each other upon insertion into the opening 24.

When the fastening clip is entirely inserted into the opening 24 so that the seal 18 rests on the component 14, the fastening portion 22 or the latching wings and the webs 40 can move back to the initial position in which the latching wings 48 latch behind the opening 24 of the component 14. The webs 40 are pressed apart by the connecting element 42.

A high flexibility of the fastening portion 22 is provided due to the flexibility of the latching wings 48 and of the webs 40 and due to the flexible fastening of the webs 40 by the connection element 42, so that an adaptation to openings 24 of different sizes 24 and also a stable mounting in the opening 24 is permitted.

As in the embodiment shown, the webs 40 are arranged in a V-shape and can be connected to each other by the connecting element 42, they cannot buckle away upon insertion into the opening 24 so that the fastening portion 22 has a higher stability. As seen in cross-section, the latching wings 48 are also arranged in an acute angle with respect to the respective web 40, so that an edge is also formed between the latching wing 48 and the web 40, which ensures a higher stability of the fastening portion 22.

The invention claimed is:

1. A fastening clip (10), in particular for a lining part (12) of a vehicle, comprising a base body (16) which has a retaining portion (20) for the lining part (12), the retaining portion (20) including a seat (26), in particular for a lining part (12), the seat (26) having a flange, the flange (30) having a surrounding ring (36) and a head (32), the ring (36) being mounted to the head by spring elements (38) so as to be rotatable to a limited extent, a fastening portion (22) being provided on the retaining portion which can be inserted into an opening (24) of a vehicle-fixed component (14), in particular of a vehicle body part, and which can latch therein, wherein the fastening portion (22) includes at least two flexible latching wings (48) each held on a flexible web (40), the webs (40) being spaced apart from each other and arranged in an acute angle, in particular in a V-shape with respect to each other, and the latching wings (48) extending from the webs (40) and away from each other, and a flexible connecting element (42) connecting the webs (40) on the entire length to each other being provided between the webs (40).

2. The fastening clip according to claim 1, wherein the latching wings (48) are held on the webs (40) substantially on the entire length thereof.

3. The fastening clip according to claim 1, wherein the latching wings (48) are configured in a substantially semi-conical shape.

4. The fastening clip according to claim 1, wherein the spring elements (38) extend in a spiral manner from the head (32) to the ring (36).

5. A fastening clip comprising:
a base body having a retaining portion that includes a seat having a flange, the flange including a surrounding ring mounted to a head by spring elements that allow limited rotation of the ring relative to the head;

a fastening portion provided on the base body and including two flexible latching wings each held on a flexible web, the webs being spaced apart and arranged at an acute angle with respect to each other, the latching wings extending away from the webs and each other; and a flexible connecting element provided between the webs, the flexible connecting element connecting the webs to each other along the entire length of the webs.

6. The fastening clip according to claim 5, wherein the spring elements spiral radially outward from the head and toward the ring.

* * * * *